F. D. WINTERLING.
LOCKING DEVICE.
APPLICATION FILED MAR. 22, 1909.
948,804.
Patented Feb. 8, 1910.
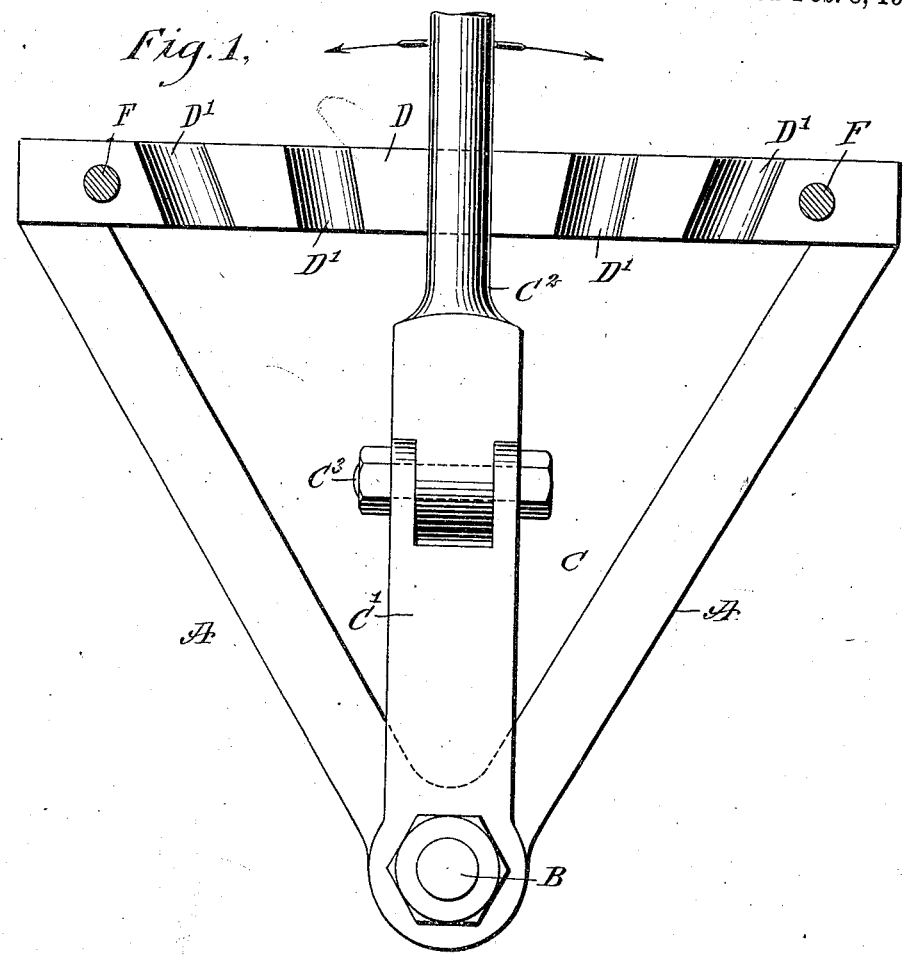
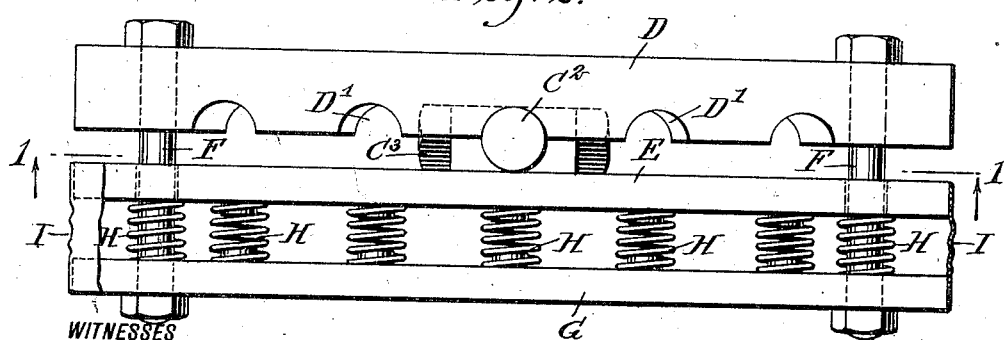
WITNESSES
Edward Thorpe
Theo. J. Hoster
INVENTOR
Frank Donnell Winterling
BY
ATTORNEYS

UNITED STATES PATENT OFFICE.

FRANK DONNELL WINTERLING, OF NEW YORK, N. Y.

LOCKING DEVICE.

948,804.  Specification of Letters Patent.  Patented Feb. 8, 1910.

Application filed March 22, 1909. Serial No. 484,865.

*To all whom it may concern:*

Be it known that I, FRANK DONNELL WINTERLING, a citizen of the United States, and a resident of the city of New York, borough of Manhattan, in the county and State of New York, have invented a new and Improved Locking Device, of which the following is a full, clear, and exact description.

The invention relates to manually controlled levers, such as the controlling levers of automobiles and the like, and its object is to provide a new and improved locking device arranged to securely hold the controlling lever in position against accidental displacement, and to prevent the operator from shifting the controlling lever too far.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a sectional side elevation of the improvement on the line 1—1 of Fig. 2; and Fig. 2 is a plan view of the same, part being shown in section.

In the supporting frame A is journaled a shaft B, connected with the part to be controlled, and on the shaft B is secured the controlling lever C, preferably made in two sections C' and C², connected with each other by a pivot C³, as plainly shown in the drawings. The lower or fulcrum section C' of the lever C is secured on the shaft B, while the upper section C² is the handle section, and is capable of swinging transversely in addition to its longitudinal movement, on moving the lever C in the usual manner. The handle section C² of the lever C is adapted to engage notches D' in the face of the bar D, extending longitudinally and forming part of the supporting frame A, and the said handle section C² is pressed in contact with the bar D and its notches D' by a spring-pressed bar E, located directly opposite the notched bar D, and mounted to slide toward and from the same on studs F held in the ends of the notched bar D. On the studs F is also held an abutment bar G, between which and the bar E are interposed springs H, so as to press the bar E in contact with the handle section C² of the lever C. Now by the arrangement described the lever C is firmly pressed in engagement with the bar D and its notches D' by the spring-pressed bar E, so that the controlling lever is securely held against accidental displacement owing to the jolts and jars of the automobile, and the operator in shifting the lever C in a longitudinal direction is not liable to move the controlling lever too far, as the spring-pressed bar E readily forces the handle section C² into the next notch D' on swinging the lever C in a longitudinal direction.

The bars G and E may be connected with each other at the top, bottom and ends by a fabric covering I, arranged in bellows shape, so as to allow yielding movement of the bar A, as above explained, when shifting the lever C longitudinally. By the use of this covering I the springs H are prevented from being clogged up by dust, oil or other impurities.

Having thus described my invention, I claim as new and desire to secure by Letters Patent:

1. A locking device for controlling levers of automobiles and the like, comprising a bar having notches in its face for engagement by one side of the controlling lever studs on the ends of the said notched bar, a pair of spaced bars mounted on the said studs, and springs interposed between the bars of the said pair to force the innermost bar against the controlling lever to hold the latter in place on the notched bar.

2. A controlling mechanism, comprising spaced bars, of which one is notched and the other spring-pressed and capable of sliding toward or from the notched bar, and a controlling lever made in two sections, pivotally connected with each other, one of the sections being the fulcrum section and the other the handle section, the axis of the pivot for the said sections extending in the direction of the length of the said bars, to allow the handle section to move longitudinally and to swing laterally.

3. A locking device for controlling levers of automobiles and the like, comprising three bars spaced apart from each other, the central bar being slidable toward and from the outer bars, springs between the central bar and one of the outer bars, the other outer bar having notches on its inner face for engagement by the lever.

In testimony whereof I have signed my name to this specification in the presence of two subscribing witnesses.

FRANK DONNELL WINTERLING.

Witnesses:
TheO. G. Hoster,
John P. Davis.